Nov. 7, 1933.    T. E. MURRAY    1,933,749
TUBULAR STRUCTURE AND METHOD OF MAKING SAME
Filed May 8, 1929

Inventor
THOMAS E. MURRAY.
By His Attorneys

Patented Nov. 7, 1933

1,933,749

UNITED STATES PATENT OFFICE 1,933,749

TUBULAR STRUCTURE AND METHOD OF MAKING SAME

Thomas E. Murray, Brooklyn, N. Y.; Joseph Bradley Murray, Thomas E. Murray, Jr., and John F. Murray, executors of said Thomas E. Murray, deceased, assignors to Metropolitan Engineering Company, a corporation of New York Application May 8, 1929. Serial No. 361,529

4 Claims. (Cl. 29—148.2)

This invention relates to a tubular structure and a method of making the same and to a union or fitting for joining and autogenously or hermetically sealing successive pipe or tubular lengths.

An object of the invention is to provide a tubular structure or piping in which successive pipe lengths are joined both mechanically and hermetically.

Another object of the invention is to provide a pipe union or fitting having extensions adapted to fit a pipe or tubular member that may be threaded into said union and capable of being welded or otherwise autogenously or hermetically joined to said pipe or tubular member.

If such a system were formed by an autogenous welding of the pipe directly to the threaded portion of a union, the heating and cooling incident to the welding operation would distort and impair the threads of the union and pipe.

The present invention, therefore, provides a method by which an autogenous joint or weld may be made between the union or fitting and the pipe blank fitted thereto without distorting or impairing the threads of the union.

With these and other objects in view which will appear from the following description, the invention comprises the tubular structure and fitting described in the following specification and claims.

Figure 1:
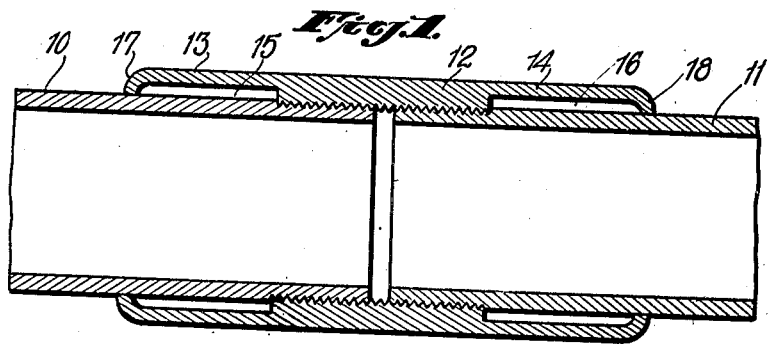
Figure 2:
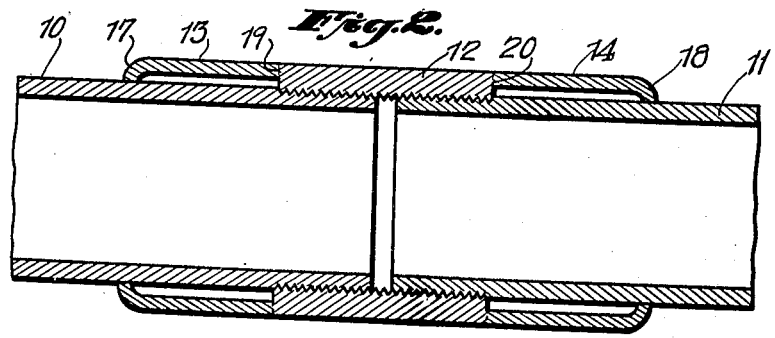
Figure 3:
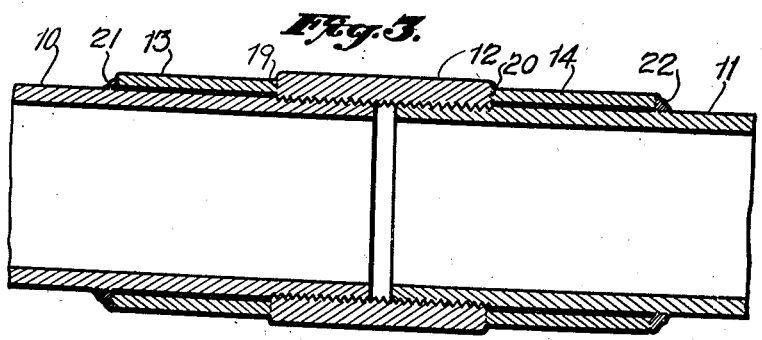

Various features of the invention are shown in the accompanying drawing in which Fig. 1 is a longitudinal sectional view of a portion of the tubular structure and of the union or coupling joining the two sections of pipe;

Fig. 2 is a similar longitudinal view of a tubular structure embodying a modified form of coupling or union, and Fig. 3 is a similar longitudinal sectional view of another modification of the union or fitting.

Referring more particularly to Fig. 1, the tubular structure of the present invention comprises a pair of pipe lengths 10 and 11 having screw threaded ends threaded into a collar portion 12 of the union or fitting joining the adjacent ends of the pipe sections 10 and 11. The collar portion 12 is preferably made of a relatively thick heavy cast or forged metal. Extending from each end of the collar portion 12 are relatively thin tubular extensions 13 and 14, the outer surfaces of which form continuations of the surface of the collar 12. The extensions 13 and 14, are, however, thinner than the collar portion 12 thereby forming thin annular spaces 15 and 16 at each end of the collar 12.

The free ends of the extensions 13 and 14 are turned inwardly at 17 and 18 to closely fit the outer surfaces of the pipe lengths 10 and 11. The inturned portions 17 and 18 serve to guide the pipe lengths 10 and 11 as they are brought into position to be threaded into the collar 12 and ensure against any crossing of the threads due to imperfect alignment. The extensions 13 and 14 also serve to stiffen the joint against transverse stresses and thus remove considerable transverse stresses from the central collar portion of these stresses from the central collar portion 12 and from the threaded ends of the pipe lengths 10 and 11.

When a weld or hermetic seal is to be made between the pipe lengths 10 and 11 and the extensions 13 and 14, the inturned parts 17 and 18 also provide a close contact suitable for receiving the weld.

In forming the fitting 12—14, the central collar portion and the two extensions may be formed or forged in a single piece and then turned to the proper dimensions and threaded.

In the form of the invention shown in Fig. 2, the central collar portion 12 and the extensions 13 and 14 are formed separately and then joined to an integral unit by butt-welding the ends of the extensions 13 and 14 to opposite ends of the collar 12 as at 19 and 20. This welding may be done in any suitable way as, for example, by electric butt-welding by the application of a current of extremely high amperage for a very brief duration of time, as described in Murray Reissue Patent 15,466 of 1922. In order to avoid any distortion of the threads of the central collar portion 12, the welding is done before this portion is threaded.

In the form shown in Fig. 3, the extensions 13 and 14 are butt-welded to the central collar portion 12 in a manner similar to that in Fig. 2. The extensions 13 and 14 in this form of the invention are, however, not provided with the inturned end portions 17 and 18 but are of smaller diameter than the central collar portion 12 and thus lie closely adjacent the pipe sections 10 and 11. In forming this fitting, as in the fitting of Fig. 2, the extension members 13 and 14 are first butt-welded to the central collar portion and the latter is then internally threaded to receive the threaded ends of the pipes 10 and 11. After the pipe sections 10 and 11 have been threaded into the central collar member 12, the outer or free ends of the extensions are welded to the outer surfaces of the pipe lengths 10 and 11 at 21 and 22 by arc or acetylene welds.

Through the above invention, the pipes 10 and 11 may be more easily and readily connected by a threaded fitting or coupling and the union thus formed greatly strengthened against lateral or bending stresses. The invention moreover provides means for additionally strengthening this union by autogenous welding without distorting or impairing the effectiveness of the threaded union.

What I claim is:

1. A coupling comprising a threaded collar and tubular extensions welded to the end faces of said collar, said extensions having a diameter adapted to position the peripheral face of at least the end section thereof in relatively close spaced relationship to the outer peripheral face of tubular sections adapted to be threaded into said collar and having a length adapted to bring the ends of said extensions to a point substantially remote from the threaded section of the collar to a distance at least sufficient to prevent deleterious heat conduction to the threads of said collar and tubular sections when the said ends are welded to the outer peripheral face of a section threaded into the collar.

2. A continuous tubular structure comprising tubular sections threaded at each end, the abutting threaded ends of said sections being engaged in couplings of the type described and claimed in claim 1, the peripheral edges of the ends of the extensions of said coupling being autogenously welded to the outer peripheral surfaces of the tubular sections.

3. The method of forming couplings of the type described and claimed in claim 1 which comprises welding relatively thin tubular extensions to the opposite ends of a relatively thick collar member and thereafter forming screw threads on the internal face of said collar.

4. The method of forming a continuous tubular structure which comprises threading the abutting ends of threaded tubular sections into a coupling comprising a threaded collar section having relatively thin tubular extensions welded on opposite ends thereof, said extensions having a diameter adapted to position the inner face thereof in relatively close spaced relationship to the outer peripheral face of said tubular section and a length adapted to position the peripheral edge of the ends of said extensions at a point substantially remote from the threaded section of the said collar to a distance at least sufficient to prevent deleterious heat conduction to the said threads when the extension ends are welded to the peripheral face of said section and thereafter welding the peripheral edges only of said extensions to the peripheral outer face of said tubular section.

THOMAS E. MURRAY.